(12) United States Patent
Shimura

(10) Patent No.: US 7,761,961 B2
(45) Date of Patent: Jul. 27, 2010

(54) TOOL AND METHOD FOR FIXING INSTALLATION OBJECT ON WHEEL

(75) Inventor: Kazuhiro Shimura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 1072 days.

(21) Appl. No.: 10/583,929

(22) PCT Filed: Jan. 25, 2005

(86) PCT No.: PCT/JP2005/000911

§ 371 (c)(1),
(2), (4) Date: Jun. 20, 2006

(87) PCT Pub. No.: WO2005/070708

PCT Pub. Date: Apr. 8, 2005

(65) Prior Publication Data

US 2009/0139063 A1    Jun. 4, 2009

(30) Foreign Application Priority Data

Jan. 26, 2004    (JP) .............................. 2004-017155

(51) Int. Cl.
*F16L 33/08* (2006.01)
*G01M 17/02* (2006.01)

(52) U.S. Cl. ..................... 24/274 R; 73/146

(58) Field of Classification Search ............... 24/274 R; 73/146

See application file for complete search history.

(56) References Cited

U.S. PATENT DOCUMENTS

| | | | |
|---|---|---|---|
| 1,776,850 A | | 9/1930 | Cheswright |
| 2,386,629 A | | 10/1945 | North |
| 3,528,142 A | * | 9/1970 | Lodholm ................ 24/274 R |
| 4,103,637 A | * | 8/1978 | Luc ......................... 24/274 R |
| 4,221,030 A | | 9/1980 | Bernede |
| 4,244,088 A | * | 1/1981 | Sauer ...................... 24/274 R |
| 4,300,270 A | | 11/1981 | Sauer |
| 4,507,956 A | | 4/1985 | Schlesinger et al. |
| 4,510,484 A | | 4/1985 | Snyder |
| 5,682,651 A | * | 11/1997 | Sauer ...................... 24/274 R |

(Continued)

FOREIGN PATENT DOCUMENTS

DE    28 54 675    3/1980

(Continued)

*Primary Examiner*—Robert J Sandy
(74) *Attorney, Agent, or Firm*—Greer, Burns & Crain, Ltd.

(57) ABSTRACT

An apparatus and method for fixing an installation object on a wheel, which are enabled to restrain rotation of a housing caused by a tightening torque of a worm screw, and to thereby prevent breakage of the housing. The apparatus for fixing an installation object on a wheel includes a band which is looped around a rim well portion of the wheel and holds the installation object. While a housing for holding a worm screw is fixed to one end portion of the band, a plurality of slits for engaging with a thread of the worm screw are provided in the other end portion of the band. The apparatus includes a rotation restraining mechanism which projects more outward than the housing in a width direction of the band, and restrains rotation of the housing caused by a tightening torque of the worm screw.

7 Claims, 4 Drawing Sheets

U.S. PATENT DOCUMENTS

| | | | |
|---|---|---|---|
| 5,956,817 A * | 9/1999 | Chen | 24/274 R |
| 6,662,665 B1 | 12/2003 | Huang | |
| 2002/0060453 A1 | 5/2002 | Spurgat | |

FOREIGN PATENT DOCUMENTS

| | | |
|---|---|---|
| JP | 31-677 | 1/1956 |
| JP | 55-47006 | 4/1980 |
| JP | 55-82890 | 6/1980 |
| JP | 1982-164091 | 5/1984 |
| JP | 9-136517 | 5/1997 |
| JP | 10-315720 | 12/1998 |
| JP | 11-342712 | 12/1999 |
| JP | 2002-13682 | 1/2002 |
| JP | 2004-106768 | 4/2004 |

* cited by examiner

TOOL AND METHOD FOR FIXING INSTALLATION OBJECT ON WHEEL

TECHNICAL FIELD

The present invention relates to a tool and a method for fixing an arbitrary installation object on a rim well portion of a wheel. More specifically, the present invention relates to a tool and a method for fixing an installation object on a wheel, which are configured to prevent rotation of a housing caused by a tightening torque of a worm screw, and are thereby enabled to prevent breakage of the housing in a portion corresponding to the worm screw.

BACKGROUND ART

For the purpose of collecting physical quantities such as an air pressure of a pneumatic tire, and a temperature inside an air chamber of the tire, a measuring device, which has various sensors mounted therein, on a rim well portion of a wheel, has been installed (refer to, for example, Patent Document 1).

For a tool for fixing an installation object, such as the above described measuring device, on the rim well portion of the wheel, it is required that attaching and detaching work is easy, and furthermore, that looseness will not easily occur over a long time period, in a state where the object is installed.

In response, using a band, which is provided with a worm screw mechanism, as the tool for fixing an installation object on a wheel can be considered. When a worm screw is tightened up in a state where the band provided with a worm screw mechanism is looped around the rim well portion, however, a housing is rotated by a tightening torque of the worm screw, a stress concentrates on a part where the housing and the band are jointed to each other, and the stress sometimes causes breakage of the housing. Additionally, if fixing of the installation object is completed without recognizing the breakage of the housing, there is a possibility that the fixing tool is broken down and the installation object is detached from the rim well portion during traveling of a vehicle. Once this situation occurs, it becomes necessary to remove a tire from the wheel to work over fixing the installation object. Therefore, in order to use the band, which is provided with the worm screw mechanism, as the tool for fixing an installation object on a wheel, it is necessary to eliminate the disadvantages associated with tightening of the worm screw.

[Patent Document 1] Japanese patent application Kokai publication No. Sho60-71306

DISCLOSURE OF THE INVENTION

An object of the present invention is to provide a tool and a method for fixing an installation object on a wheel, which are enabled to prevent rotation of a housing caused by a tightening torque of a worm screw, and thereby to prevent breakage of the housing.

A tool for fixing an installation object on a wheel according to the present invention for achieving the above object is a fixing tool including a band which is looped around a rim well portion of the wheel and thereby holds the installation object. In the fixing tool, while a housing for holding a worm screw is fixed to one end portion of the band, a plurality of slits allowed to engage with a thread of the worm screw are provided in the other end portion of the band. The fixing tool is characterized by including a rotation restraining mechanism which, by projecting more outward than the housing in a width direction of the band, restrains rotation of the housing caused by a tightening torque of the worm screw.

Additionally, a method for fixing an installation object on a wheel according to the present invention for achieving the above object is a method for fixing an installation object on a wheel by means of a fixing tool including a band which is looped around a rim well portion of the wheel and thereby holds the installation object. In the fixing tool, while a housing for holding a worm screw is fixed to one end portion of the band, a plurality of slits allowed to engage with a thread of the worm screw are provided in the other end portion of the band. The method is characterized by including the steps of pressing the housing against the rim well portion by means of a rotation preventing jig which is matched with a shape of the housing, and tightening up the worm screw in a state where the housing is pressed.

In the present invention, the disadvantages associated with tightening of the worm screw are eliminated by adopting the above described configurations when an arbitrary installation object is fixed on the rim well portion of the wheel by using the band including a worm screw mechanism.

That is, since the tool for fixing an installation object on a wheel according to the present invention includes a rotation restraining mechanism which projects more outward than the housing in a width direction of the band, the tool can restrain rotation of the housing caused by a tightening torque of the worm screw and prevent breakage of the housing.

As the rotation restraining mechanism, any one of structures described below can be adopted. The first one is a structure where a housing extended portion which projects outward in a width direction of the band is provided to the housing in one body with the housing. The second one is a structure where a band extended portion which projects outward in a width direction of the band is provided to one end portion of the band in one body with the band. The third one is a structure where an extension member which projects outward in a width direction of the band is installed onto the housing. The extension member is formed of an elastically deformable material, and it is preferable that, when the band is tightened, the extension member should become deformed along a contour of the rim well portion.

On the other hand, in the method for fixing an installation object on a wheel according to the present invention, since the worm screw is tightened up in the state where the housing is pressed against the rim well portion by means of a rotation preventing jig matched with a shape of the housing, the method can restrain rotation of the housing caused by a tightening torque of the worm screw and prevent breakage of the housing.

According to the present invention, since it is made difficult for breakage of the housing to occur, it becomes possible to prevent the installation object from detaching from the rim well portion during traveling of a vehicle before it happens.

BRIEF DESCRIPTION OF THE DRAWINGS

FIGS. 2A, 2B and 2C are a plan view, a side view, and a cross-sectional view taken along a line II-II, respectively.

FIGS. 3A and 3B are a bottom view, and a cross-sectional view taken along a line III-III, respectively.

BEST MODE FOR CARRYING OUT THE INVENTION

Figure 1:
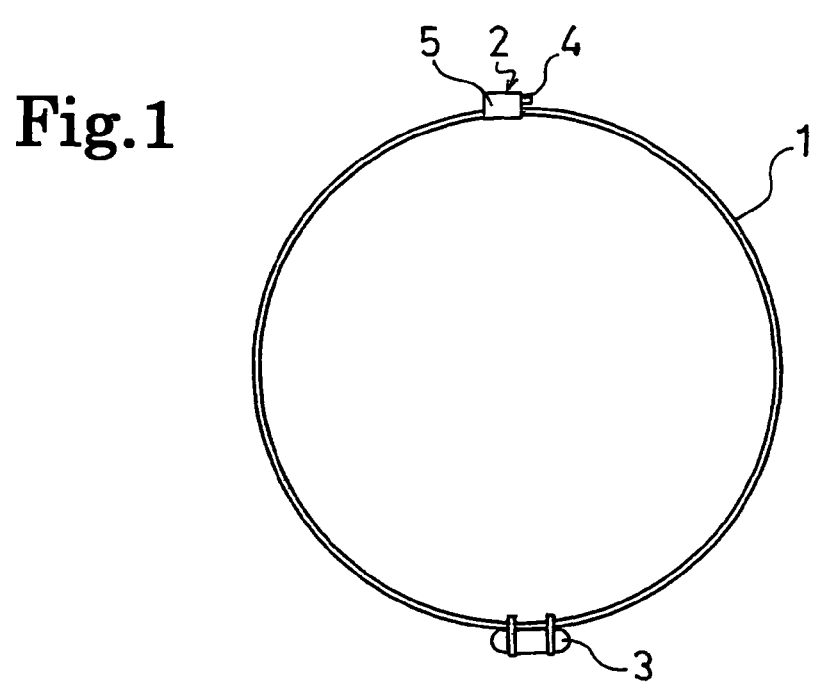
FIG. 1 is a side view schematically showing a tool for fixing an installation object on a wheel according to the present invention.

Hereinbelow, detailed descriptions will be given of configurations of the present invention with reference to the accompanying drawings. The same reference numerals and symbols designate the same elements throughout the drawings, and duplicated detailed descriptions on the same elements will be omitted.

FIG. 1 schematically shows a tool for fixing an installation object on a wheel, according to the present invention. In FIG. 1, a band 1 is looped around a rim well portion of the wheel, and both end portions of the band 1 are configured to be fastened to each other by means of a worm screw mechanism 2. While this band 1 may continues as one body around an entire circumference of the rim well portion, the band 1 may be obtained by jointing plural divided band pieces with one another along the rim well portion. It is preferable that stainless steel is used as a material forming the band 1.

An installation object 3 is fixed to the band 1. The installation object 3 is not limited with respect to a purpose and a configuration thereof, but in this case, constitutes a measuring device where various sensors for collecting physical quantities, such as an air pressure of a pneumatic tire, and a temperature inside an air chamber of the tire, are mounted inside an enclosure. Other than the sensors, a buttery, a transmitter, a receiver, a control circuit, an antenna and the like are mounted in this measuring device, whereby results measured by the sensors can be transmitted to the outside of the tire at appropriate times.

Figure 2:
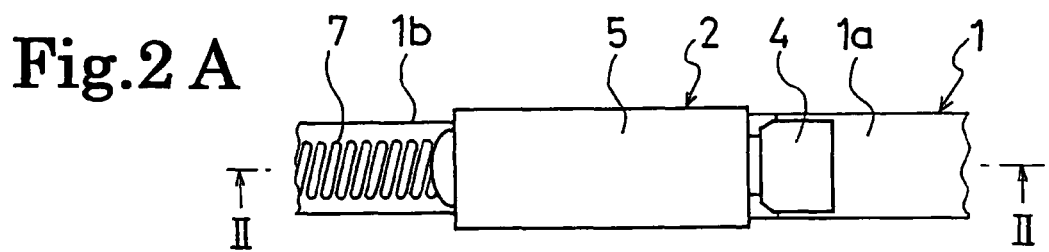
FIGS. 2A to 2C show a basic configuration of a worm screw mechanism.
Figure 2:
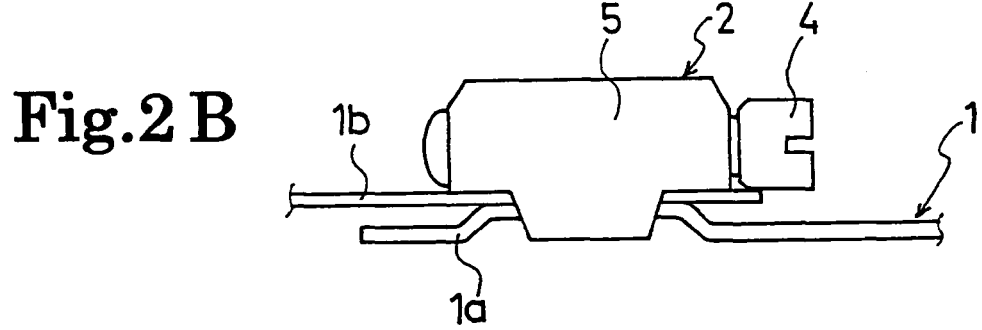
Figure 2:
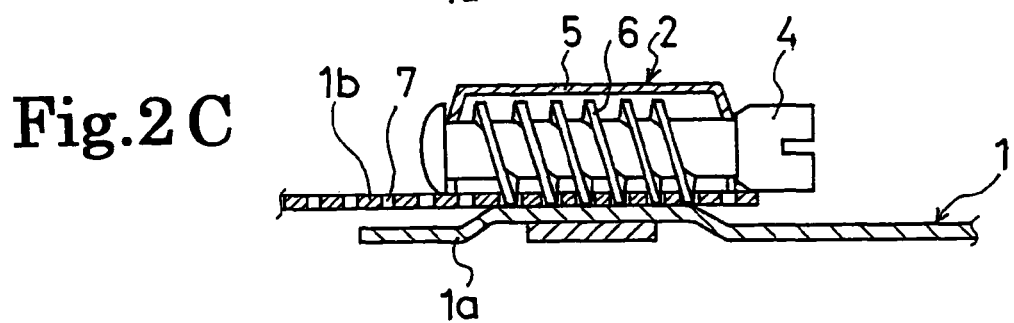

FIGS. 2A to 2C show a basic configuration of the worm screw mechanism. As shown in FIGS. 2A to 2C, in the worm screw mechanism 2, a dome-shaped housing 5 which holds a worm screw 4 is jointed to one end portion 1a of the band 1. The worm screw 4 is arranged in a manner that an axial direction thereof extends in parallel with a length direction of the band 1, and the worm screw 4 is freely rotatably supported by the housing 5. On the other hand, a plurality of slits 7 allowed to engage with a thread 6 of the worm screw 4 is provided to the other end portion 1b of the band 1. This other end portion 1b is inserted into the housing 5, while the thread 6 of the worm screw 4 is allowed to engage with the slits 7. By tightening up the worm screw 4, a circumferential length of the band 1 is shortened. By inversely turning the worm screw 4, the band 1 is loosen, and by doing so furthermore, a fastened state of the band 1 can be released.

In a case where an installation object is fixed to the rim well portion of the wheel by using the fixing tool configured as described above, the band 1 is looped around the rim well portion of the wheel, and the both end portions of the band 1 are fastened to each other by the worm screw mechanism 2. It is only necessary to fix the installation object 3 to the band 1 before or after the fastening of the band 1. Thereby, attaching and detaching work of the installation object 3 can be easily performed. In addition, there is an advantage that a state tightened by the worm screw 4 can be maintained for a long time period without being loosen. On the other hand, a large torque occurs when the worm screw 4 is tightened up. As a result, the housing 5 is rotated by the torque, a stress concentrates on a part where the housing 5 and the band 1 are jointed to each other, and the stress sometimes causes breakage of the housing 5.

For this reason, a rotation restraining mechanism, which projects more outward than the housing 5 in a width direction of the band, and restrains rotation of the housing 5 caused by a tightening torque of the worm screw 4, is added to the fixing tool.

Figure 3:
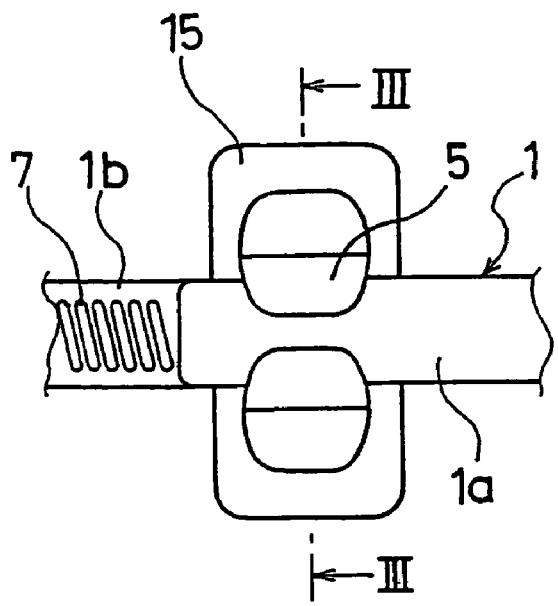
FIGS. 3A and 3B show an important part of a tool for fixing an installation object on a wheel, according to an embodiment of the present invention.
Figure 3:
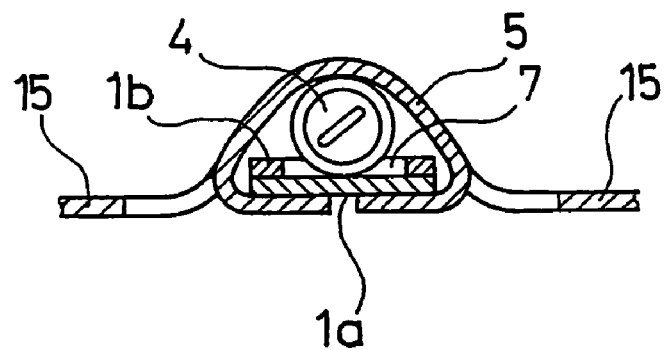

FIGS. 3A and 3B show an important part of a tool for fixing an installation object on a wheel, according to an embodiment of the present invention. In this embodiment, as the rotation restraining mechanism, a housing extended portion 15 projecting outward in a width direction of the band is formed to the housing 5 in one body with the housing 5. That is, while the housing 5 is obtained by processing, for example, a plate of stainless steel, parts of both sides of the housing 5 are folded back inward in a width direction of the band and thereby jointed to the one end portion 1a of the band 1, and the other parts thereof constitute the housing extended portions 15 by projecting outward in a width direction of the band.

In a case where the rotation restraining mechanism formed of the housing extended portion 15 projecting outward in a width direction of the band is thus provided to the housing 5, since the housing extended portion 15 abuts the rim well portion when tightening up the worm screw 4, it becomes possible to restrain rotation of the housing 5 caused by a tightening torque of the worm screw 4, and to prevent breakage of the housing 5.

Figure 4:
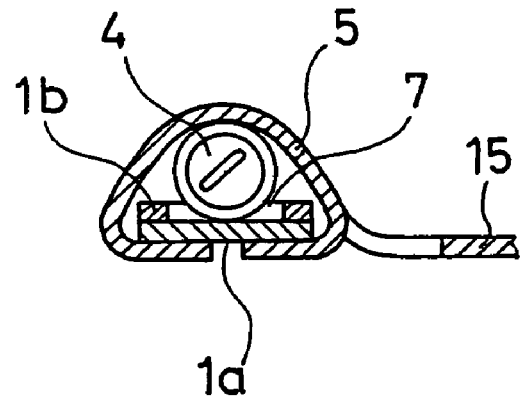
FIG. 4 is a cross-sectional view showing a modification example of FIGS. 3A and 3B.

Although the housing extended portion 15 is provided to each of the both sides of the housing 5 in the aforementioned embodiment, this housing extended portion 15 may be provided to only one of the both sides of the housing 5 as shown in FIG. 4. In this case, it is necessary to make the housing extended portion 15 to project toward a direction where the worm screw 4 is tightened up. For example, in a case where the worm screw 4 is a right screw, it is only necessary to arrange the housing extended portion 15 to the right-hand side of the housing 5 as seen from a head of the worm screw 4.

Figure 5:
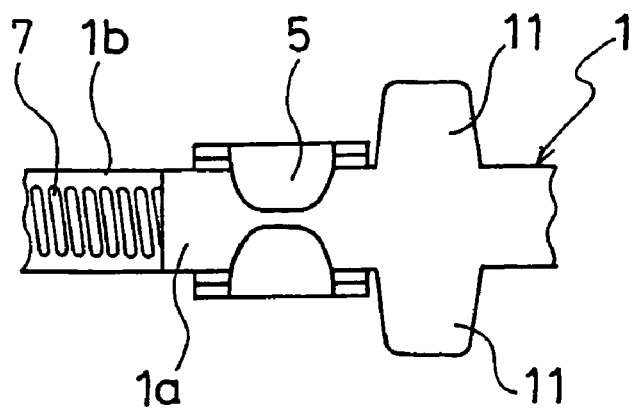
FIG. 5 is a bottom view showing an important part of a tool for fixing an installation object on a wheel, according to another embodiment of the present invention.

FIG. 5 shows an important part of a tool for fixing an installation object on a wheel, according to another embodiment of the present invention. In this embodiment, as the rotation restraining mechanism, a band extended portion 11 projecting outward in a width direction of the band is formed in the one end portion 1a of the band 1 in one body with the band 1.

In a case where the rotation restraining mechanism formed of the band extended portion 11 projecting outward in a width direction of the band is thus provided in the one end portion 1a of the band 1, since the band extended portion 11 abuts the rim well portion when tightening up the worm screw 4, it becomes possible to restrain rotation of the housing 5 caused by a tightening torque of the worm screw 4, and to prevent breakage of the housing 5.

Figure 6:
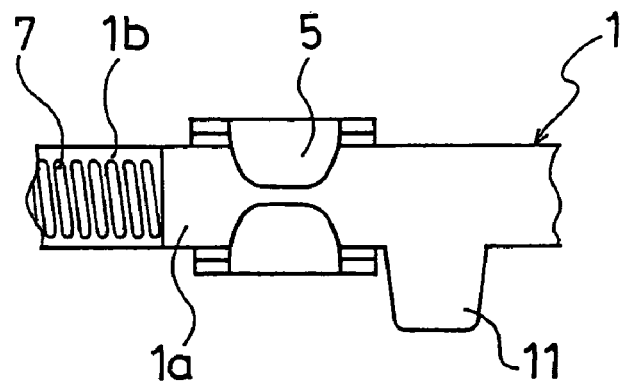
FIG. 6 is a bottom view showing a modification example of FIG. 5.

Although the band extended portion 11 is provided to each of both sides of the band 1 in the aforementioned embodiment, this band extended portion 11 may be provided to only one of the both sides of the band 1 as shown in FIG. 6. In this case, it is necessary to make the band extended portion 11 to project toward a direction where the worm screw 4 is tightened up. For example, in a case where the worm screw 4 is a right screw, it is only necessary to arrange the band extended portion 11 to the right-hand side of the band 1 as seen from a head of the worm screw 4.

Figure 7:
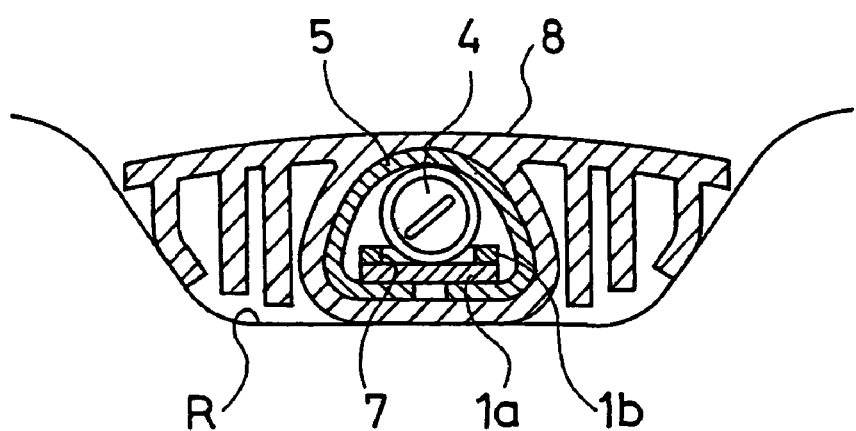
FIG. 7 is a cross-sectional view showing an important part of a tool for fixing an installation object on a wheel, according to still another embodiment of the present invention.

FIG. 7 shows an important part of a tool for fixing an installation object on a wheel, according to still another embodiment of the present invention. In this embodiment, as the rotation restraining mechanism, an extension member 8 projecting outward in a width direction of the band is installed onto the housing 5. That is, the rotation restraining mechanism may be one of a retrofitted type. In a case where the extension member 8 is formed of an elastically deformable material, since the extension member 8 becomes deformed along a contour of the rim well portion R when the band 1 is tightened, it becomes possible to correspond to various forms of the rim well portion. Resin or metal having a sufficient resistance against a rotation torque of the housing 5 and being elastically deformable by a tightening force of the band can be used as the material forming the extension member 8. In using metal, thin spring steel is adequate. Note that, since deformation of the extension member 8 is influenced also by a shape factor, the material should not be categorically determined depending only on bending stiffness.

In a case where the extension member 8 projecting outward in a width direction of the band is installed onto the housing 5, since the extension member 8 abuts the rim well portion when tightening up the worm screw 4, it becomes possible to restrain rotation of the housing 5 caused by a tightening torque of the worm screw 4, and to prevent breakage of the housing 5.

Figure 8:
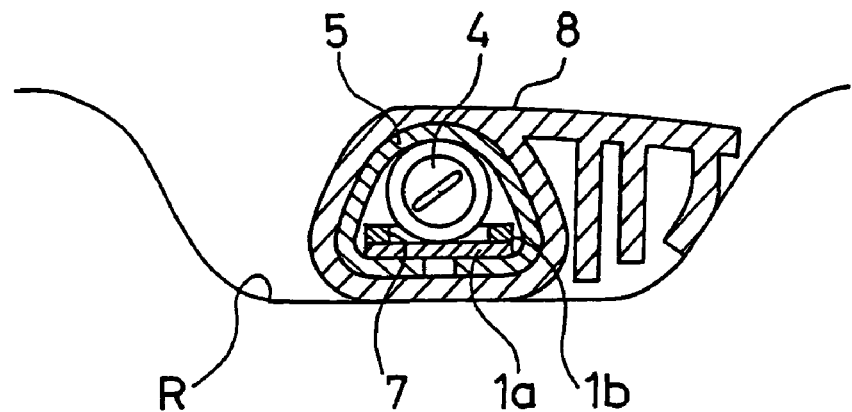
FIG. 8 is a cross-sectional view showing a modification example of FIG. 7.

Although the extension member 8 projecting into both sides of the housing 5 is used in the aforementioned embodiment, this extension member 8 may project into only one of the both sides of the housing 5 as shown in FIG. 8. In this case, it is necessary to make the extension member 8 to project toward a direction where the worm screw 4 is tightened up. For example, in a case where the worm screw 4 is a right screw, it is only necessary to arrange the extension member 8 to the right-hand side of the housing 5 as seen from a head of the worm screw 4.

Although the aforementioned embodiments are obtained by adding the rotation restraining mechanism to the fixing tool, it is also possible to prevent uplift of the housing, which is caused by a reaction force of a rotation torque, by using a rotation preventing jig instead of adding this rotation restraining mechanism.

Figure 9:
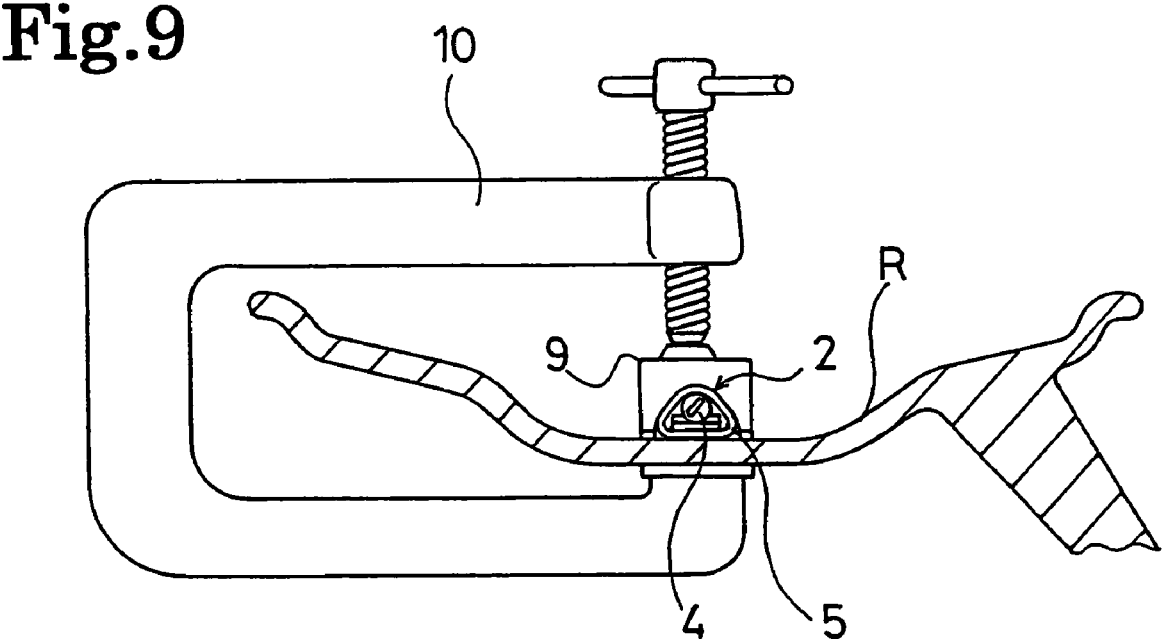
FIG. 9 is a cross-sectional view showing a method for fixing an installation object on a wheel according to an embodiment of the present invention.

FIG. 9 shows a method for fixing an installation object on a wheel, according to an embodiment of the present invention. First, as shown in FIG. 9, the fixing tool (refer to FIG. 2) formed of the band 1 provided with the worm screw mechanism 2 is arranged onto the rim well portion R of the wheel, and the both end portions of the band 1 are fastened to each other by means of a worm screw mechanism 2. However, the worm screw 4 should not be securely tightened up in this state. Subsequently, an outer side of the housing 5 is covered with a rotation preventing jig 9, which includes a pressing face matching the shape of the housing 5, and the housing 5 is pressed against the rim well portion R by tightening the rotation preventing jig 9 by means of a vise 10. Thereafter, the band 1 is tightened by tightening up the worm screw 4 in this pressed state, and fixing of the installation object is thereby completed.

In a case where the worm screw 4 is thus tightened up in the state where the housing 5 is pressed against the rim well portion R by using the rotation preventing jig 9 matched with a shape of the housing 5, it becomes possible to restrain rotation of the housing 5 caused by a tightening torque of the worm screw 4, and to prevent breakage of the housing 5.

While the detailed descriptions have been given of the preferred embodiments of the present invention hereinabove, it should be understood that various modifications to, substitutions for, and replacements with the preferred embodiments can be carried out as long as the modifications, the substitutions, and the replacements do not depart from the spirit and the scope of the present invention defined by the attached scope of claim.

What is claimed is:

1. An apparatus for fixing an installation object on a wheel comprising:
   a band which is looped around a rim well portion of the wheel and holds the installation object;
   a housing for holding a worm screw fixed to one end portion of the band;
   a plurality of slits for engaging with a thread of the worm screw provided in the other end portion of the band; and
   a rotation restraining mechanism which restrains rotation of the housing caused by a tightening torque of the worm screw by including at least one housing extended portion that projects more outward than the housing in a width direction of the band,
   wherein said at least one housing extended portion comprises a plate with a cutout portion therein, where said cutout portion is formed by cutting a portion of said plate and folding said portion over the band.

2. The apparatus for fixing an installation object on a wheel according to claim 1, wherein said housing extended portion is integrally formed with the housing.

3. A method for fixing an installation object on a wheel by use of a fixing apparatus in which a band which is looped around a rim well portion of the wheel and holds the installation object is included; and while a housing for holding a worm screw is fixed to one end portion of the band, a plurality of slits for engaging with a thread of the worm screw are provided in the other end portion of the band, the method characterized by including the steps of pressing the housing against the rim well portion by means of a rotation preventing jig which is matched with a shape of the housing, and tightening the worm screw in a state where the housing is pressed.

4. An apparatus for fixing an installation object on a wheel comprising:
   a band which is looped around a rim well portion of the wheel and holds the installation object;
   a housing for holding a worm screw fixed to one end portion of the band;
   a plurality of slits for engaging with a thread of the worm screw provided in the other end portion of the band; and
   a rotation restraining mechanism which restrains rotation of the housing caused by a tightening torque of the worm screw by including at least one band extended portion that projects more outward than the housing in a width direction of the band,
   wherein said at least one band extended portion comprises a portion of said band that extends outwards from said band in the width direction, and further wherein said at least one band extended portion is integrally formed with said band of a same material as said band.

5. An apparatus for fixing an installation object on a wheel comprising:
   a band which is looped around a rim well portion of the wheel and holds the installation object;
   a housing for holding a worm screw fixed to one end portion of the band;

a plurality of slits for engaging with a thread of the worm screw provided in the other end portion of the band; and a rotation restraining mechanism which restrains rotation of the housing caused by a tightening torque of the worm screw by including at least one extended portion that projects more outward than the housing in a width direction of the band, wherein said at least one extended portion includes a portion extending outwards from said housing in a widthwise direction of the band, and further wherein said widthwise direction extending portion is installed onto said housing.

6. The apparatus for fixing an installation object on a wheel according to claim 5, further comprising a plurality of fins extending in a heightwise direction, wherein said fins are connected to said widthwise direction extending portion.

7. The apparatus for fixing an installation object on a wheel according to claim 5, wherein the extended portion is formed of an elastically deformable material, and thereby, when the band is fastened, the extended portion becomes deformed along a contour of the rim well portion.

* * * * *